(12) United States Patent
Chen et al.

(10) Patent No.: US 10,330,138 B2
(45) Date of Patent: Jun. 25, 2019

(54) COATED METAL ARTICLE

(71) Applicant: HAMILTON SUNDSTRAND CORPORATION, Charlotte, NC (US)

(72) Inventors: Lei Chen, South Windsor, CT (US); Blair A. Smith, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 222 days.

(21) Appl. No.: 15/174,949

(22) Filed: Jun. 6, 2016

(65) Prior Publication Data

US 2017/0350435 A1    Dec. 7, 2017

(51) Int. Cl.
| | |
|---|---|
| *C25D 3/66* | (2006.01) |
| *C25D 11/04* | (2006.01) |
| *C25D 15/02* | (2006.01) |
| *F16B 33/00* | (2006.01) |
| *F16B 33/06* | (2006.01) |

(52) U.S. Cl.
CPC ............ *F16B 33/008* (2013.01); *C25D 3/665* (2013.01); *C25D 11/04* (2013.01); *C25D 15/02* (2013.01); *F16B 33/06* (2013.01)

(58) Field of Classification Search
CPC ........ F16B 33/008; F16B 33/06; C25D 11/16; C25D 3/665; C25D 11/04; C25D 15/02
See application file for complete search history.

(56) References Cited

U.S. PATENT DOCUMENTS

| | | | | |
|---|---|---|---|---|
| 5,691,004 | A | * 11/1997 | Palazzolo | .................. C23C 4/02 |
| | | | | 427/236 |
| 2006/0292392 | A1 | * 12/2006 | Froning | ................ B23K 35/286 |
| | | | | 428/659 |
| 2013/0202815 | A1 | * 8/2013 | Hass | ........................ C23C 16/06 |
| | | | | 427/576 |

* cited by examiner

*Primary Examiner* — Patrick D Niland
(74) *Attorney, Agent, or Firm* — Cantor Colburn LLP

(57) ABSTRACT

An article is disclosed that includes a first substrate of a first metal or metal alloy. An aluminum alloy first layer on a surface of the first substrate includes is galvanically less noble than the first metal or metal alloy. The first layer can also include elements alloyed with or in solid solution with the aluminum alloy, or can include a two or more phase composition including a first phase of aluminum and a second phase of a solid lubricant.

18 Claims, 4 Drawing Sheets

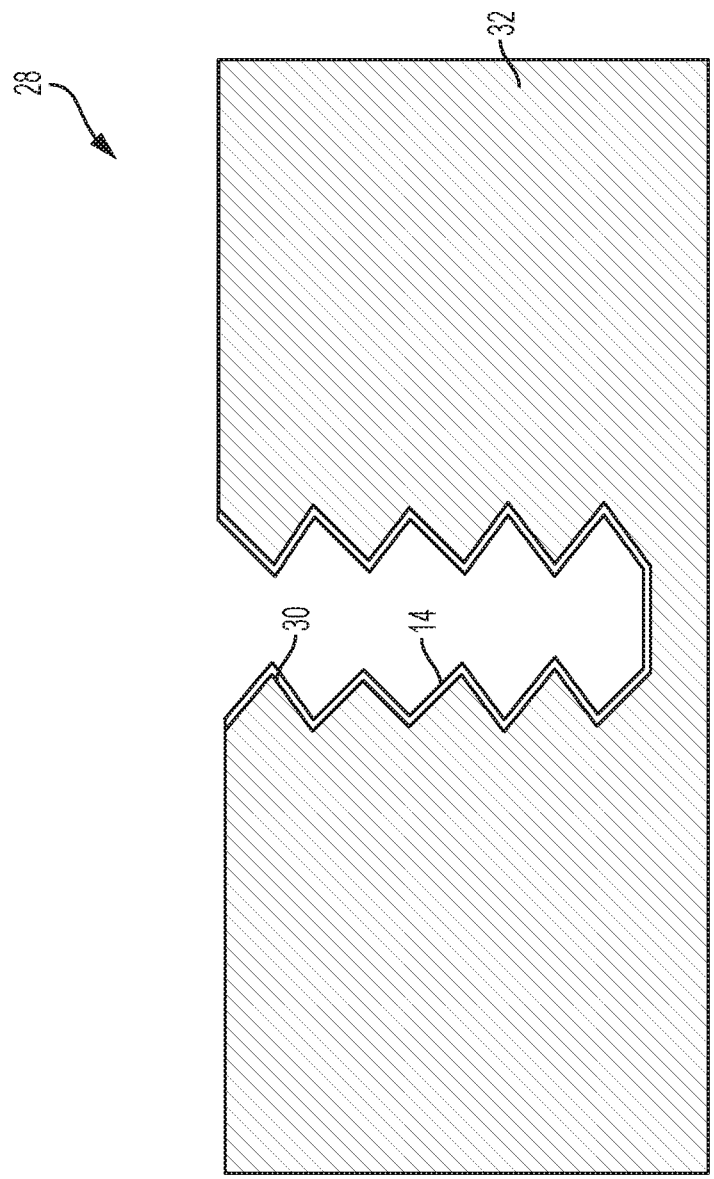

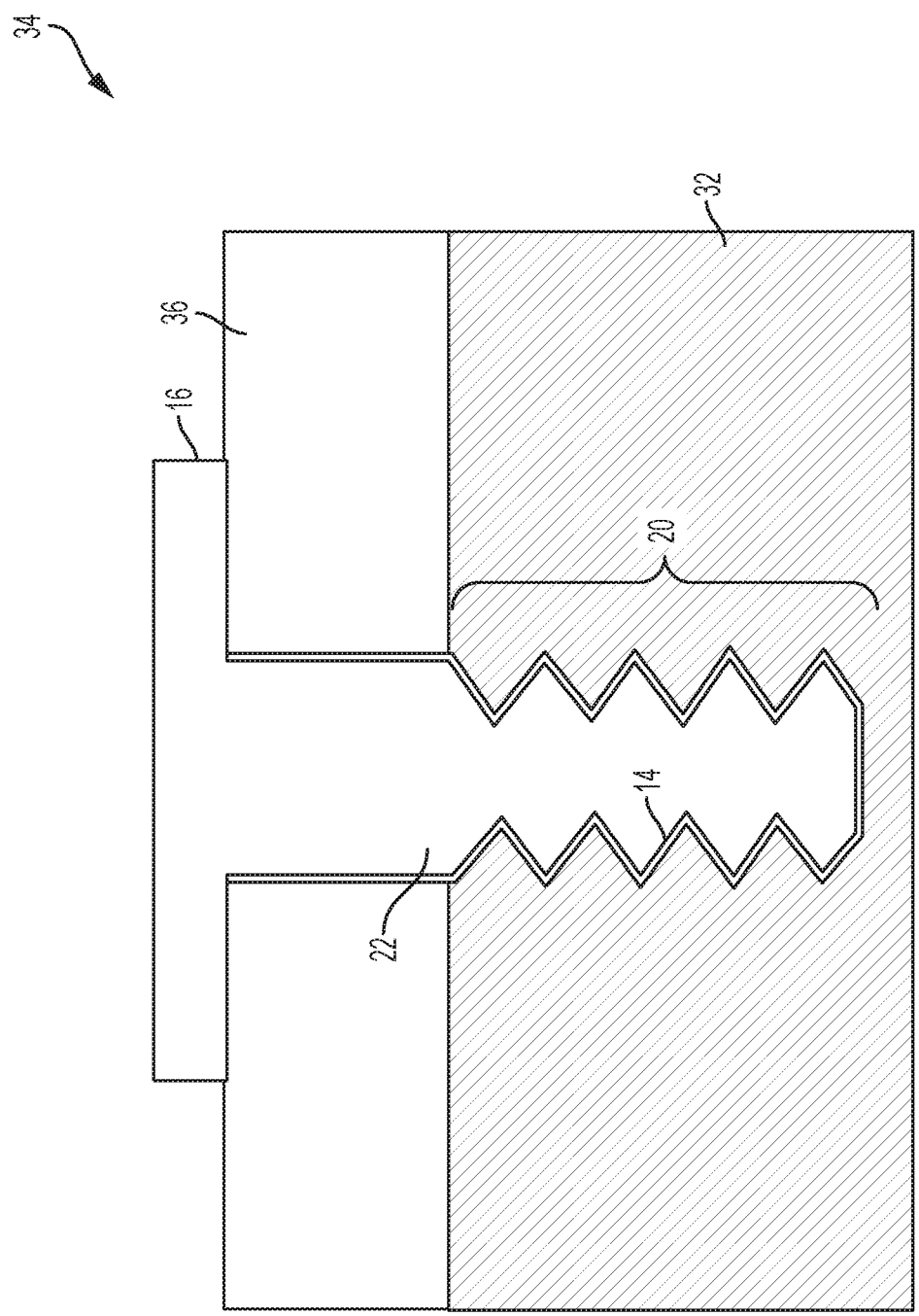

COATED METAL ARTICLE

BACKGROUND

Cadmium plating has been widely used on various materials, including but not limited to high-strength steel, aircraft components, fasteners, electrical connectors, and numerous others. Cadmium has been used to promote properties such as corrosion resistance, lubricity, and electrical conductivity. Cadmium's low cost of plating and it's anti-galling performance (no adhesive wear on threaded surfaces) have contributed to its widespread use. However, continued commercial uses of cadmium have been facing pressure due to health concerns in recent years, including being listed as a substance of very high concern (SVHC) in 2012 by the European Union environment & safety regulatory agency REACH.

Many alternatives to cadmium plating have been developed and evaluated over the years with none fully matching the properties of cadmium layer, most notably corrosion protection, lubricity or anti-galling performance, or compatibility with corrosion resistance-promoting passivation treatments. For example, aluminum has been proposed as an alternative to cadmium plating, but its lubricity/anti-galling performance is inferior to cadmium. Consequently, due to the lack of similar lubricity or anti-galling properties possessed by Cd, pure Al may sometimes cause seizure or result in improper torque tension for threaded components.

BRIEF DESCRIPTION

According to some embodiments of the disclosure, an article comprises a first substrate comprising a first metal or metal alloy and a first layer on a surface of the first substrate comprising an aluminum alloy that is galvanic alloy less noble than the first metal or metal alloy. Additionally, one of the following conditions is satisfied:

(1) the aluminum alloy has a higher galvanic kinetic activity than pure aluminum, and comprises an element other than molybdenum alloyed or in solid solution with aluminum that increases the galvanic kinetic activity of the aluminum alloy compared to that of pure aluminum;

(2) the aluminum alloy has a higher galvanic kinetic activity than pure aluminum, and comprises an element alloyed or in solid solution with aluminum that increases the galvanic kinetic activity of the aluminum alloy compared to that of pure aluminum and is present in an amount in excess of a thermodynamic equilibrium limit for formation of an aluminum alloy or solid solution;

(3) the aluminum alloy has a higher galvanic kinetic activity than pure aluminum, and comprises an element alloyed or in solid solution with aluminum that increases the galvanic kinetic activity of the aluminum alloy compared to that of pure aluminum, and an outer surface of the first layer comprises an oxide or sulfide of said element; or (4) the first layer comprises a two or more phase composition comprising a first phase comprising the aluminum alloy, and a second phase comprising a solid lubricant.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 3 is a schematic depiction of a cross-sectional view of another threaded fastener substrate having coated threads; and FIG. 4 is a schematic depiction of an assembly of the threaded fasteners of FIGS. 2 and 3.

DETAILED DESCRIPTION

Figure 1:
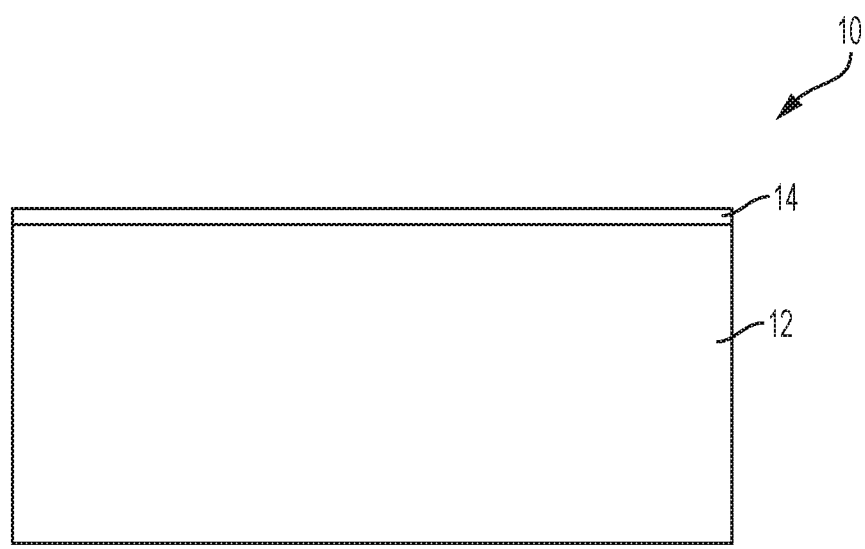
FIG. 1 is a schematic depiction of a cross-sectional view of a coated article as described herein.

With reference now to the Figures, FIG. 1 schematically depicts a cross-sectional view of a coated article 10 comprising a substrate 12 having thereon a surface layer 14. The substrate 12 comprises a metal or metal alloy having a first oxidation-reduction equilibrium (corrosion) potential more noble than aluminum and aluminum alloys. This difference in potential can allow the layer to provide sacrificial corrosion protection in an electrolyte that is experienced in the service environment where the parts are used. In some embodiments, the metal or metal alloy of substrate 12 has an electrode potential of −1.0 V to 0 V with respect to saturated calomel electrode (SCE) in 3.5% wt. sodium chloride solution or sea water solution or synthetic sea water solution, more specifically −0.6 to −0.1, and even more specifically from −0.4 V to −0.2 V. Examples of metals or metal alloys for the substrate 12 include but are not limited to high-strength steels (e.g., D6AC, 300M, M-50, AERMET 100, 4330, 4340, 52100).

As mentioned above, the layer 14 comprises aluminum. In some embodiments, the layer 14 further comprises a first (at least one) alloying element alloyed with or in solid solution with the aluminum. In some embodiments, an alloying element is present in the layer in an amount in excess of a thermodynamic equilibrium limit for formation of an aluminum alloy or solid solution. In some embodiments, an outer layer includes an oxide or sulfide of an alloying element. In some embodiments, an alloying element is present in the layer in an amount in excess of a thermodynamic equilibrium limit for formation of an aluminum alloy or solid solution, and an outer surface of the layer comprises an oxide or sulfide of an alloying element. In some embodiments, the layer 14 further comprises a third metal or additional alloying metals alloyed with or in solid solution with the aluminum. In some embodiments, the alloying elements can be chosen from Mo, W, Ag, Sn, Sb, Bi, Au, Zn, Ga or In.

In some embodiments, the alloying element(s) can be present in an amount in a range having a low end of 0.005% atomic fraction (a/o), more specifically 0.01% (a/o) wt. %, and even more specifically 0.02% (a/o), and an upper end of 95% (a/o), more specifically 93% (a/o), and even more specifically 90% (a/o), based on the total amount of aluminum and alloying element(s). The above range endpoints can be independently combined to serve as a disclosure of a number of different ranges. As mentioned above, in some embodiments the aluminum alloy has a higher galvanic kinetic activity than pure aluminum. Galvanic kinetics are described in more detail in T. H Randall, Galvanic Corrosion—A Kinetic Study, J. Chem. Educ., 1994, 71 (3), p 261, the disclosure of which is incorporated herein by reference in its entirety. The relative kinetic activity can be determined by a simple test in which an electrode of the aluminum alloy and an electrode of pure aluminum are disposed in an electrolyte, and the galvanic current between the electrodes measured. The aluminum alloy has a higher galvanic kinetic activity greater than aluminum if it is the anode in the galvanic circuit.

As mentioned above, in some embodiments, the aluminum alloy has a higher galvanic kinetic activity than pure aluminum, and comprises an element other than molybdenum alloyed or in solid solution with aluminum that increases the galvanic kinetic activity of the aluminum alloy compared to that of pure aluminum. Whether or not an element increases or decreases the galvanic activity of the aluminum alloy compared to that of aluminum can be easily determine by a simple test where two galvanic cells are prepared, each with an aluminum electrode and an electrode of the alloy either with or without the element, and comparing galvanic currents. In some embodiments, the aluminum alloy has a higher galvanic kinetic activity than pure aluminum, and comprises an element alloyed or in solid solution with aluminum that increases the galvanic kinetic activity of the aluminum alloy compared to that of pure aluminum, and an outer surface of the first layer comprises an oxide or sulfide of said element. Examples of elements for inclusion in the aluminum alloy above equilibrium limits or that are converted to oxides or sulfides include but are not limited to W, Ag, Sn, Sb, Bi, Au, Zn, or combinations comprising any of the foregoing. Although this disclosure is not limited to or by any particular mode or theory of operation, it is believed that the presence of alloying elements as described herein can impact the sacrificial protection characteristics (e.g., the activity of the sacrificial corrosion so that it is neither too active nor insufficiently active, i.e. passivation) and the lubricity of the surface of the layer 14. Multiple alloying elements can be used to strike a balance between corrosion protection and solid lubricity, and in some embodiments the layer 14 comprises a third element or a plurality of elements alloyed with or in solid solution with the aluminum.

The layer 14 can be deposited or applied to the substrate 12 using various techniques. Examples of application techniques include, but are not limited to, electrodeposition (e.g., electroplating), thermal spray (e.g., plasma spray, flame spray, cold spray, HVOF (high velocity oxy-fuel coating spray), and other known thermal spray techniques), magnetron sputtering, physical vapor deposition, or curable aluminum slurry. Due to its non-line of sight capability, electrodeposition in non-aqueous electrolytes such as ionic liquids can provide technical benefits for applying the multifunctional coating onto a part with complex geometry such as the bolts described in FIG. 1. As mentioned above, in some embodiments, co-deposition with electroplating techniques can be utilized to form layers in which the alloying metal(s) are present in an amount in excess of a thermodynamic equilibrium limit for formation of an aluminum alloy or solid solution. In some embodiments, electroplating (for co-deposition or for mono-deposition) can be performed in an ionic liquid. An ionic liquid, as used herein, means a salt having a melting point below the processing temperature of the electroplating process (e.g., below 100° C.). In some embodiments, the ionic liquid is non-volatile or of low volatility at the electroplating process temperature. Examples of ionic liquids include aluminum chloride-1-methyl-3-ethylimidazolium chloride ($AlCl_3$-EtMeImCl), or 1-(1-4 butyl)pyridinium chloride (N—BPCl).

As mentioned above, in some embodiments, the layer 14 can include a sulfide or oxide of an alloying element(s). In some embodiments, the sulfide or oxide is present at an outer surface of the layer. In some embodiments, the sulfide or oxide provides self-lubricating when the coated surface is under load and moves relative to a mating surface. As used herein, self-lubricating means that under shear stress from contact with a slideably engaged surface, layers or other fragments of the metal sulfide or oxide can become disengaged from their location on the layer surface and can re-deposit at a different location on the surface. Although the precise mechanism is not fully understood (nor is it necessary to practice the embodiments disclosed herein), it is believed that such self-lubricating behavior can be promoted by the crystal structure (including but not limited to lamellar structures) of the metal sulfide or oxide. Examples of metal sulfides or metal oxides that can exhibit self-lubricating properties include $MoS_2$, $WS_2$, ZnO, $Ag_2O$, PbO, tin oxide, antimony oxide, calcium oxide, magnesium oxide, titanium dioxide, manganese oxide. Solid lubricating additives can be co-deposited with the sacrificial Al alloy, particularly when electrodeposition in a non-aqueous medium, i.e. ionic liquids, is the coating application method. The additive particles can be dispersed in the plating electrolyte and mechanical agitation used to ensure regulated co-deposition of the particles along with metal deposition to attain desired loading and distribution. The solid lubricating particles can have a distribution in the coating to benefit both adhesion and surface lubrication. Specifically, the particle inclusion in a zone near the substrate is controlled to be low to achieve adhesion and the particle concentration in the coating increases near the coating outer surface to optimize lubricity. In another embodiment, the particle concentration peaks inside the coating and exists little to none at the substrate-coating interface and the outer surface. In some embodiments, a sulfide or oxide can be formed at the surface of layer by 14 by subjecting the applied layer to an anodizing process such as Type II anodization, boric acid-sulfuric acid anodization (BASAA), or tartaric acid-sulfuric acid anodization (TSAA).

In some embodiments, the layer (14) is treated with a trivalent chromium passivation process. Such a process can be carried out by treatment of the layered substrate (e.g., by dipping or application with a brush, sponge, spray, or other coating applicator) with an aqueous solution or non-aqueous solution comprising trivalent chromium and various anions. Exemplary anions include nitrate, sulfate, phosphate, and/or acetate. Specific exemplary trivalent chromium salts can include $Cr_2(SO_4)_3$, $(NH)_4Cr(SO_4)_2$, $KCr(SO_4)_2$, $CrF_3Cr(NO3)_3$, and mixtures comprising any of the foregoing. Embodiments of compositions and the application thereof to substrates are described in U.S. Pat. Nos. 5,304,257, 5,374,347, 6,375,726, 6,511,532, 6,521,029, and 6,511,532, the disclosures of which are incorporated herein by reference. Various additives and other materials can be included in the composition comprising trivalent chromium as disclosed in the patent literature, and the trivalent chromium salt composition can be selected from any of a number of known commercially-available compositions.

In some embodiments, the coating 14 can comprise a first matrix phase comprising the aluminum or Al alloy, and a second phase comprising a solid lubricant dispersed incorporated therein. Examples materials for the second phase include, but are not limited to PTFE particles, $MoS_2$, $WS_2$, TiN, TiC, Pb, PbO, ZnO, $Sb_2O_3$, diamond like carbon (DLC), graphite particles, boron nitride particles. In some embodiments, the solid lubricant is self-lubricating, such as a self-lubricating metal oxide or sulfide. A second phase can be co-deposited by inclusion of particles of a second phase in an aluminum slurry coating. Aluminum slurry coatings are described in more detail in A. Aguero et al., Surface & Coatings Technology 213 (2012) 229-238, the disclosure of which is incorporated herein by reference in its entirety. In some embodiments, particle co-deposition during electroplating can provide beneficial technical effects such as high coating density, non-line of sight capability and tunable particle concentration distribution. Other techniques can be used to form a multiphase layer, including but not limited to codeposition of two or more materials through thermal spray techniques such as flame spray, plasma spray, high velocity oxy-fuel (HVOF), etc.

The thickness of layer 14 can be specified to meet target specifications. In some embodiments, the layer 14 has a thickness in a range having a low end of 2.5 μm (0.0001 inches), more specifically 7.5 μm (0.0003 inches), and even more specifically 12.5 μm (0.0005 inches), and an upper end of 17.5 μm (0.0007 inches), more specifically 25 μm (0.001 inches), and even more specifically 250 μm (0.010 inches). The above range endpoints can be independently combined to serve as a disclosure of a number of different ranges. In some embodiments, the layer 14 can be utilized to promote resistance to corrosion. In some embodiments, the layer 14 can be utilized to promote resistance to galling along contact portions of the article. In some embodiments, the layer 14 can be disposed on surface to be subjected to sliding contact with another article or component. Such articles can include, but are not limited to, threaded fasteners, press-fit connections, propeller barrels, electrical connectors, press-fit high strength steel bolts used in turboprop propellers, and other various fasteners or connectors. Example embodiments of threaded connectors are schematically depicted in cross-sectional view in FIGS. 2-4.

Figure 2:
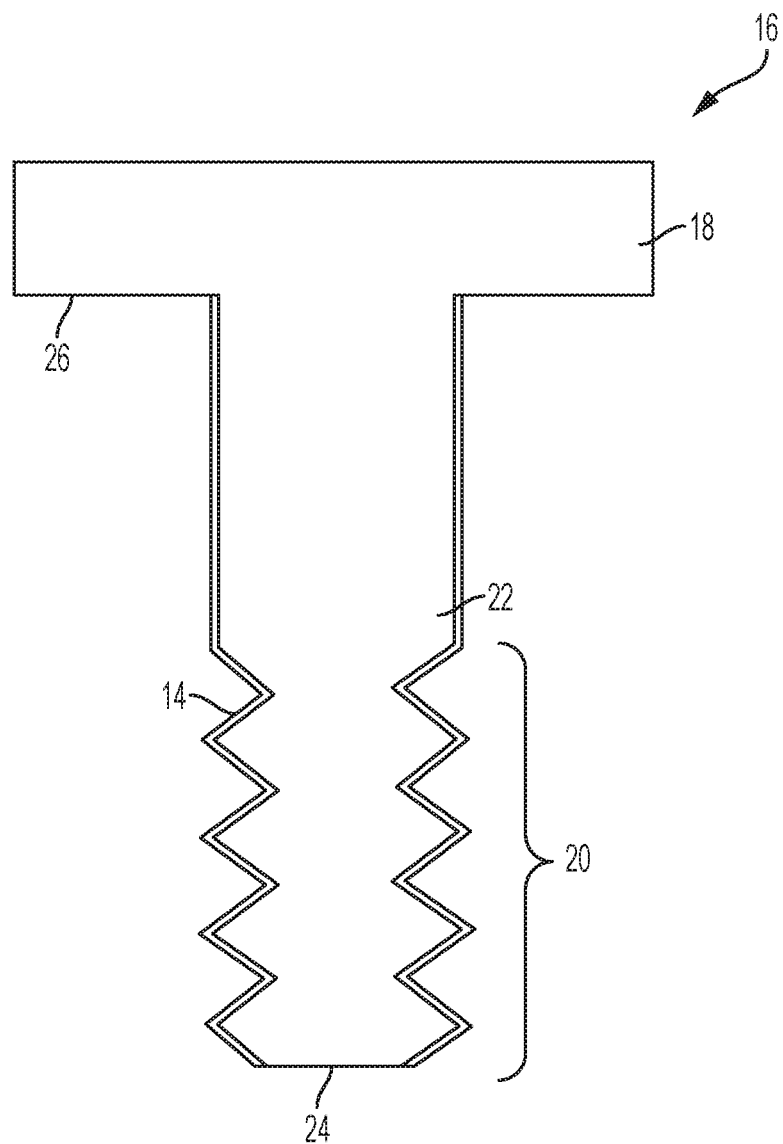
FIG. 2 is a schematic depiction of a cross-sectional view of a threaded fastener substrate having coated threads.

A male threaded fastener 16 such as a bolt or screw is shown in FIGS. 2 and 4. As shown in the Figures, the threaded fastener 16 includes a head portion 18, a threaded portion 20, and an unthreaded shank portion 22. As shown in FIG. 2, a layer 14 comprising aluminum, as described above, is disposed on a surface of the fastener 16 at the threaded portion 20 and the shank portion 22. In some embodiments, the layer 14 is disposed on the threaded portion 20. In some embodiments, the layer 14 is disposed on the shank portion 22. In some embodiments, as depicted in FIG. 2, the layer 14 is disposed on the threaded portion 20 and the shank portion 22. In some embodiments, the layer 14 can be disposed on other portions of the fastener 16, to provide corrosion protection or lubricity or both corrosion protection and lubricity, or simply because the deposition technique is not limited to the portions 20 and 22. In some embodiments, and end or tip portion 24 can have a layer 14 disposed thereon. In some embodiments, a head underside portion 26 can have a layer 14 disposed thereon. In some embodiments, the entire fastener 16 can have a layer 14 on the surfaces thereof. FIG. 4 shows the shank portion.

A female threaded fastener 28 is schematically depicted in FIG. 3. The fastener 28 is depicted as a blind threaded bore or hole 30 in a substrate 32 in FIGS. 3 and 4, but can take numerous other forms including but not limited to a threaded through-hole, or nuts, threaded inserts, washers, bearings, or non-threaded blind or through bores holes. As shown in FIG. 3, a layer 14 comprising aluminum, as described above, is disposed on a surface of the fastener 28 in the threaded bore 30. A coupled threaded fastener assembly 34 is schematically depicted in FIG. 4, in which a component 36 is secured to the substrate 32 with a threaded fastener 16. As shown in FIG. 4, a layer 14 comprising aluminum, as described above, is disposed along either or both of the male and female threads along the threaded portion 20. As shown in FIG. 4, the layer 14 can also be disposed along either or both of the shank portion 22 of the fastener 16 and the corresponding bored wall of component 36. Although not shown in FIGS. 3-4, in some embodiments, components 36 and substrate 32 could each be coated with a layer such as layer 14 comprising aluminum, as the layer can be used for any application where it is desired to reduce or prevent fretting wear. In some applications both surfaces in engagement would be coated, in others, perhaps only one of the surfaces would be coated. In some embodiments, the aluminum-layered surface of a component is in an interference fit or friction fit engagement with another component surface, which can but does not have to have its own layer comprising aluminum. In an example embodiment, the shank portion 22 in FIG. 4 is shown in an interference fit engagement with a smooth through-hole in component 36. In some embodiments, an upper portion of the threaded bore 30 in substrate 32 could also be configured as a smooth bore for engagement with a longer shank portion 22 of the bolt or fastener 16, An interference or friction fit can be achieved in various ways, including slip-fitting a protrusion (e.g., an unthreaded bolt or shaft) into a close-fitting bore or hole, or shrink-fitting or expansion-fitting caused by thermal expansion or contraction before, during, or after assembly.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An article, comprising
   a first substrate comprising a first metal or metal alloy; and
   a first layer on a surface of the first substrate, said first layer comprising an aluminum alloy that is galvanically less noble than the first metal or metal alloy, with the proviso that:
   (1) the aluminum alloy has a higher galvanic kinetic activity than pure aluminum, and comprises an element selected from tungsten, silver, antimony, bismuth, gold, gallium, or indium, alloyed or in solid solution with aluminum that increases the galvanic kinetic activity of the aluminum alloy compared to that of pure aluminum;
   (2) the aluminum alloy has a higher galvanic kinetic activity than pure aluminum, and comprises an element alloyed or in solid solution with aluminum that increases the galvanic kinetic activity of the aluminum alloy compared to that of pure aluminum and is present in an amount in excess of a thermodynamic equilibrium limit for formation of an aluminum alloy or solid solution; or
   (3) the first layer comprises a two or more phase composition comprising a first phase comprising the aluminum alloy, and a second phase comprising a self-lubricating solid lubricant selected from PTFE, MoS$_2$, WS$_2$, TiN, TiC, Pb, PbO, ZnO, Sb$_2$O$_3$, BN, graphite, diamond-like carbon, or combinations comprising any of the foregoing.

2. The article of claim 1, wherein the article is a threaded fastener and the first layer is disposed on a threaded surface portion of the threaded fastener.

3. The article of claim 2, wherein the threaded fastener comprises a threaded portion and a non-threaded shank portion, and the fastener and the first layer is disposed on portions of the threaded fastener including the threaded portion and the shank portion.

4. An assembly, comprising the article of claim 1 and a second article comprising a surface disposed in slideable contact with the coated surface of the substrate.

5. The assembly of claim 4, wherein the first component comprises a cylindrical portion rotatably disposed in a hollow portion of the second component.

6. The assembly of claim 4, wherein the second article comprises a second substrate second metal or metal alloy, and a second layer on the surface of the second article disposed in slideable contact with the coated surface of the second article, the second layer comprising an aluminum alloy that is galvanically less noble than the second metal or metal alloy, with the proviso that:
(1) the second layer aluminum alloy has a higher galvanic kinetic activity than pure aluminum and comprises an element other than molybdenum alloyed or in solid solution with aluminum that increases the galvanic kinetic activity of the aluminum alloy compared to that of pure aluminum;
(2) the second layer aluminum alloy has a higher galvanic kinetic activity than pure aluminum and comprises an element alloyed or in solid solution with aluminum that increases the galvanic kinetic activity of the aluminum alloy compared to that of pure aluminum and is present in an amount in excess of a thermodynamic equilibrium limit for formation of an aluminum alloy or solid solution;
(3) the second layer aluminum alloy has a higher galvanic kinetic activity than pure aluminum and comprises an element alloyed or in solid solution with aluminum that increases the galvanic kinetic activity of the aluminum alloy compared to that of pure aluminum, and an outer surface of the first layer comprises an oxide or sulfide of said element; or
(4) the second layer comprises a two or more phase composition comprising a first phase comprising the aluminum alloy, and a second phase comprising a solid lubricant.

7. The assembly of claim 6, wherein the first and second articles are threaded fastener components, and the first and second layers are disposed on threaded surface portions of the first and second articles, respectively.

8. The assembly of claim 7, wherein the threaded fastener components comprise a threaded portion and a non-threaded shank portion, and the fastener and the first layer is disposed on portions of the threaded fastener components including the threaded portions and the shank portions.

9. The article of claim 1, wherein the first substrate comprises steel, or steel and magnesium.

10. The article of claim 1, wherein the first layer comprises an element selected from tungsten, silver, antimony, bismuth, gold, gallium, or indium, alloyed or in solid solution with aluminum that increases the galvanic kinetic activity of the aluminum alloy compared to that of pure aluminum.

11. The article of claim 1, wherein the aluminum alloy has a higher galvanic kinetic activity than pure aluminum and comprises an element alloyed or in solid solution with aluminum that increases the galvanic kinetic activity of the aluminum alloy compared to that of pure aluminum and is present in an amount in excess of a thermodynamic equilibrium limit for formation of an aluminum alloy or solid solution.

12. The article of claim 1, wherein the aluminum alloy comprises a plurality of elements alloyed with or in solid solution with the aluminum in the first layer that increase the galvanic kinetic activity of the aluminum alloy compared to that of pure aluminum.

13. The article of claim 1, wherein the aluminum alloy has a higher galvanic kinetic activity than pure aluminum, and comprises an element alloyed or in solid solution with aluminum that increases the galvanic kinetic activity of the aluminum alloy compared to that of pure aluminum, and an outer surface of the first layer comprises an oxide or sulfide of said element selected from MoS$_2$, WS$_2$, Ag$_2$O, PbO, antimony oxide, calcium oxide, magnesium oxide, titanium dioxide, manganese oxide, or combinations comprising any of the foregoing.

14. The article of claim 13, wherein the oxide or sulfide of the first alloying element is self-lubricating.

15. The article of claim 1, wherein the first layer comprises a surface treated with trivalent chromium passivation.

16. The article of claim 1, wherein the first layer comprises a two or more phase composition comprising a first phase comprising the aluminum alloy, and a second phase comprising a solid lubricant.

17. The article of claim 16, wherein the solid lubricant is self-lubricating.

18. The article of claim 16, wherein the solid lubricant is selected from PTFE, MoS$_2$, WS$_2$, TiN, TiC, Pb, PbO, ZnO, Sb$_2$O$_3$, BN, graphite, diamond-like carbon, or combinations comprising any of the foregoing.

* * * * *